July 25, 1939.  M. L. GANSER  2,167,449

PRESSURE TESTING DEVICE

Filed March 23, 1938

WITNESS
F. J. Hartman.

INVENTOR
Montgomery L. Ganser.
George K. Hilbert
ATTORNEY

Patented July 25, 1939

2,167,449

UNITED STATES PATENT OFFICE 2,167,449

PRESSURE TESTING DEVICE

Montgomery L. Ganser, Norristown, Pa.

Application March 23, 1938, Serial No. 197,667

8 Claims. (Cl. 73—31)

My invention relates to portable instruments for testing pressure in pipe lines conducting gaseous fluids such as illuminating or fuel gas but may be employed with equal advantage for many other purposes where it is desired to determine the gaseous pressure within a pipe line, conduit or other container.

While various types of instruments for this class of pressure testing have been proposed, those commonly in use by the employees of gas companies embody a glass U-shaped gauge tube one leg of which is connected to the pipe line when the test is to be made and the pressure within the line is then determined by the relative height of fluid within the legs of the tube. But all these instruments with which I am familiar are open to certain objections, among which may be mentioned the necessity of having to introduce fresh fluid into the gauge tube preparatory to each test if it is emptied after the completion of the preceding one and the loss of fluid if it is not so emptied as well as the danger of the tube being broken unless carefully handled not only during the test but while it is being transported in the tool kit of the operative or otherwise.

It is therefore an object of my invention to provide a pressure testing device which is entirely self-contained and in which the gauge tube is enclosed within a housing which may be opened to render the tube visible while the test is actually being made and then closed so as to protect the tube and associated parts so that the instrument may be readily transported in a tool kit or the like without danger of injury.

A further object of the invention is the provision of a pressure testing device of the character aforesaid so constructed that the ends of the gauge tube are automatically closed contemporaneously with the closing of the housing and automatically opened when the housing is again placed in condition to expose the tube preparatory to making a test, thereby insuring retention of the fluid in the tube between consecutive tests irrespective of the position which the instrument may assume.

A still further object of the invention is the provision of such instrument in which the gauge tube is formed with separate legs to facilitate repair or replacement and in which all the parts are readily accessible for a like purpose; which provides means for the convenient retention within the housing of the flexible hose by which the instrument is connected to the line when a test is being made; which is of convenient form for handling and use; which is positive in operation, and in which all the parts in addition to the gauge tube which are of delicate nature and thus likely to be damaged through rough usage or contact with tools or other articles in the operative's tool kit are adequately protected when the housing is closed.

Still further objects, advantages and novel features of design, construction and arrangement comprehended by the invention are hereinafter more particularly pointed out or will be apparent to those skilled in the art from the following description of a preferred embodiment thereof as illustrated in the accompanying drawing in which.

In the several figures like symbols are used to designate the same parts.

Figure 1:
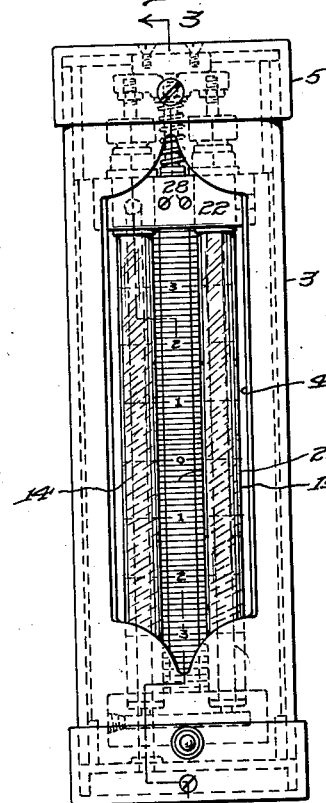
Fig. 1 is a front view of the device with the housing open as when making a test.

More particularly, the device comprises a housing formed of two relatively rotatable cylindrical sleeves disposed one within the other. The outermost of these sleeves 3 is suitably cut away to form a generally longitudinally extending opening 4 through which when in proper position a portion of the tube gauge and associated scale within the housing may be viewed; this sleeve is provided with a cap 5 at its upper end removably secured in place as by a screw 6. The inner housing sleeve generally designated as 7 is of suitable diameter to snugly but rotatably fit within the outer sleeve, and between its end portions 7a, 7b is also cut away so that only a rear segment 7c approximating a little more than a third of the original circumference of the sleeve is left as a connecting member between the said end portions. At the lower end of sleeve 7 is a cap 8 snugly receiving the lower extremity of the outer sleeve and within this cap and forming a seat for both sleeves is a base 9 which may be downwardly flanged as at 9a and thus spaced from the bottom of cap 8 so as to provide a chamber 10 between the base and the cap. The base is firmly secured in the cap in any suitable way as by fitting it tightly therein and gluing the parts together with waterproof glue or by riveting them together and the lower part 7b of sleeve 7 is also secured to the base as by L-shaped brackets 11 or in any other suitable way the arrangement, however, being such, irrespective of its particular details of construction, that sleeve 7, cap 8 and base 9 form an operatively unitary structure.

I prefer to make the several parts of the housing to which I have referred of bakelite, fibre or other strong non-metallic material though of course metal or other materials may be used for the purpose if desired.

Figure 3:
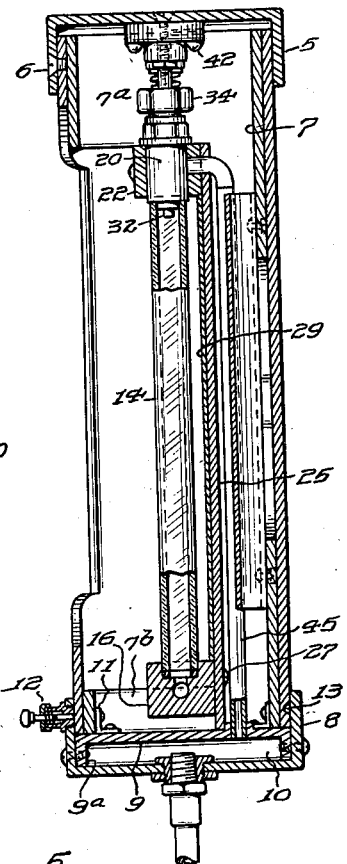
Fig. 3 is a vertical section substantially on line 3—3 in Fig. 1.
Figure 5:
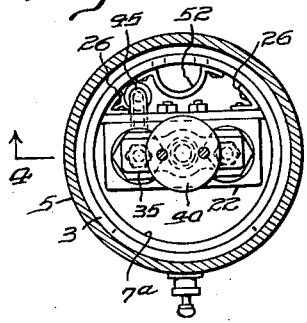
Fig. 5 is a transverse section on line 5—5 in Fig. 4 but on the same scale as the first three figures.

It will thus be apparent that the outer sleeve 3 with its associated cap 5 can be rotated with respect to the inner sleeve, lower end cap 8 and base 9 so as to bring opening 4 into registry with the cut-away portion of the inner sleeve as best shown in Figs. 1 and 3 or so as to bring the opening into registry with segmental part 7c of the inner sleeve which is diametrically opposite its cut-away portion, and for holding the sleeves in the latter position I preferably associate with the lower end cap 8 a spring pressed plunger and housing therefor generally designated as 12 so arranged that the plunger will automatically engage in a depression 13 in the outer sleeve when the opening 4 registers with part 7c; by retracting the plunger the sleeves can then be turned relatively to each other to bring them to the position shown in Figs. 1 and 3.

Figure 4:
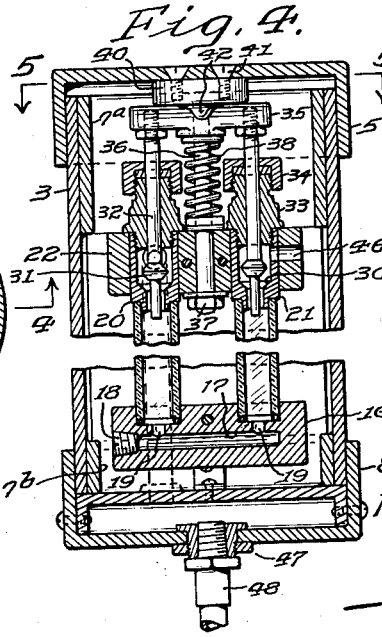
Fig. 4 is a fragmentary enlarged vertical section on line 4—4 in Fig. 5 showing certain of the parts in the positions assumed when the housing is open as when a test is in progress.
Figure 6:
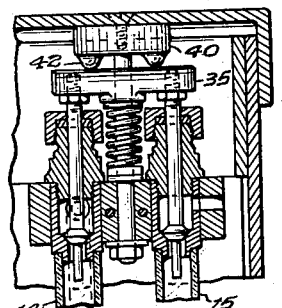
Fig. 6 is a fragmentary view generally corresponding to Fig. 5 but showing some of the same parts in the positions assumed when the housing is closed as after the completion of a test.

The gauge tube of glass or other transparent material is disposed within the inner sleeve and so arranged that its legs or branches lie on opposite sides of the axis of the sleeve with their axes respectively in a plane passing therethrough, and while this tube may be integral from one end to the other in accordance with the usual construction of U-tubes, I prefer to make the legs or branches separate as shown so that in case one is broken it can be readily replaced without the necessity of replacing the other. Thus, in its preferred embodiment the tube comprises two identical legs or sections 14, 15 the lower ends of which are seated in bores in a block 16 comprising a transverse bore 17 having its end closed by a plug 18 and passages 19 extending therefrom to the respective tubes so that there is free communication between their lower ends. A suitable sealing compound (not shown) may be employed to prevent leakage between the tubes and the block. The upper ends of the tube legs as best shown in Figs. 4 and 6 respectively communicate with bushings 20, 21 carried in another block 22 more nearly adjacent the upper end of the instrument and are sealed to the bushings to prevent leakage.

I thus provide the equivalent of the ordinary U-tube employed in testing devices of the class to which my invention relates yet one which is so constructed that either leg may be readily replaced by removing block 22 from its supporting structure which consists of a flat strip 25 of bakelite or the like secured in the inner sleeve as by small brackets 26 riveted to the parts or in any other suitable way so that the strip is held rigidly in place within the inner sleeve. The lower block 16 is in turn removably attached to the strip as by one or more screws 27 and the upper block similarly attached thereto as by screws 28 or in any other convenient way and the gauge tube legs 14, 15 are thus supported slightly in advance of the strip by reason of the disposition of the bores and bushings in the respective blocks as best shown in Fig. 3. On the front face of the strip, that is, the face adjacent the tube, is secured a scale 29 suitably calibrated to afford a convenient means of determining any differential in the height of the fluid in the two branches of the tube and thus, in turn, the pressure in the line to which the instrument is attached as hereinafter described.

Each of bushings 20, 21 is internally bored and formed to provide a valve seat 30 adjacent its lower end cooperative with a valve 31 on a stem 32 extending upwardly beyond the bushing through a nipple 33 provided at its upper end with a gland 34 to prevent leakage about the stem, the nipples being screwed into or otherwise secured to the upper ends of the bushings and the valve stems of course being axially slidable. At their upper ends the valve stems are received in a crosshead 35 slidable on a stem 36 which is fixedly secured in block 22, conveniently by providing the stem with a flange above the block and threading a nut 37 onto its lower extremity below the latter, and a compression coil spring 38 is interposed between the crosshead and the flange and constantly tends to urge the crosshead upwardly away from the block and thus maintain valves 31 in the position shown in Fig. 4, that is, out of engagement with their respective seats.

The upward movement of the crosshead is limited by its engagement with a plate 40 secured to the under side of cap 5 by screws 41 or in any other convenient way so that it will turn with the cap, the axis of the plate being coincident with that of stem 36 which in turn is coincident with that of the housing. This plate is provided with diametrically opposed camming elements on its under face desirably consisting of substantially semi-spherical projections 42 which, when the parts are in the position shown in Fig. 4, lie on opposite sides of the crosshead but are adapted when the plate, cap and outer sleeve 3 of the housing are turned relatively to the inner sleeve to ride up on the upper surface of the crosshead, which may be suitably beveled to facilitate this movement of the camming elements, so as to depress the crosshead and in turn the valve stems to thereby force the valves against their respective seats as shown in Fig. 6, this closing the upper ends of the gauge tube against the passage of fluid therefrom.

Communication is established between chamber 10 and the upper end of one of the gauge tube branches, for example branch 14, by a small pipe 45 the lower end of which pierces base 9 and is sealed therein and the upper end of which is turned at right angles and communicates with the interior of bushing 20 while a passage 46 is formed through the wall of the other bushing 21 and correspondingly through block 22 to permit the escape of air from the other branch of the tube while the fluid is being initially introduced thereto and thereafter while tests are being made.

For connecting chamber 10 with a source of fluid supply when the gauge tube is to be filled and also for connecting it with the line in which the gas pressure is to be tested, an internally threaded bushing 47 is seated in end cap 8 for the reception of a threaded nipple 48 on one end of a flexible hose 50 the other end of which can be connected to said source or to the pipe line. As it is normally desirable and convenient to detach the hose from the instrument when the latter is not in use and since when so detached it is likely to be mislaid or damaged, I prefer to house the hose within the instrument under such conditions and for this purpose provide a narrow slot 51 approximately midway between the ends of inner sleeve 7 and centrally of segmental portion 7c thereof, the slot being thus adapted to register with opening 4 in the outer sleeve when the latter is turned to closed position as in Fig. 2 and, adjacent the inner side of this slot I secure a substantially semi-circular shield 52 extending beyond its ends. Thus when the hose is removed from bushing 47 and the housing closed, first one end of the hose can be introduced into slot 51 and pushed along the shield in one direction and then the other end introduced and pushed in the opposite direction until the hose assumes approximately the position shown in dotted lines in Fig. 2 and so lies wholly or substantially within the periphery of the housing from which position it can, however, be readily removed by grasping its center portion through the slot and drawing it out of the housing preparatory to re-attachment to bushing 47.

*Operation*

Figure 2:
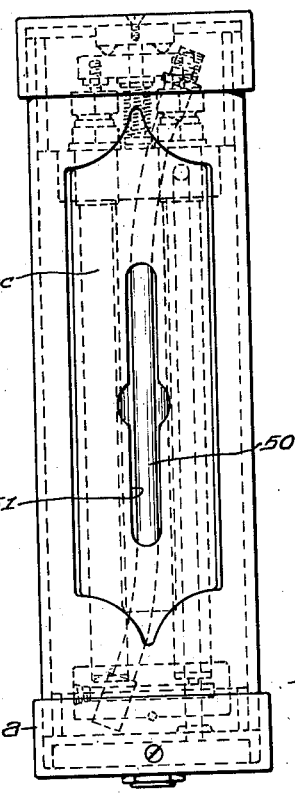
Fig. 2 is a similar view with the housing closed and the connecting hose disposed within it.

Assuming it is desired to test the pressure of a gas line and the device is in the condition of Fig. 2, that is, with the housing closed, hose 50 is first removed from the housing and attached to nipple 47. The outer sleeve of the housing is then turned relatively to the inner sleeve, conveniently by holding cap 8 in one hand and withdrawing the spring pressed plunger 12 with the fingers of that hand while grasping cap 5 and turning it and the outer sleeve with the other, until opening 4 assumes approximately the position shown in Fig. 1, thereby exposing the major portion of the gauge tube and scale to view. As the housing is thus opened, camming elements 42 slide off crosshead 35 thereby allowing the latter to rise under the influence of spring 38 and correspondingly raise valves 31 from their seats so as to open the upper ends of the gauge tube. If the latter is empty or contains an insufficient amount of fluid it can now be filled to the proper level by forcing fluid through hose 48 under sufficient pressure to cause it to fill chamber 10 and then flow through pipe 45 and bushing 20 into tube leg 14 whence it can pass through bore 17 and passages 19 in lower block 16 into the other leg 15 of the tube from which as the fluid level rises the air can escape through passage 46. After sufficient fluid has been supplied to fill the gauge tube to the desired level, the pressure is relieved from the hose and the superfluous fluid contained in pipe 45 and chamber 10 allowed to escape, and when water is used as the testing fluid it may be conveniently introduced by merely blowing it from the mouth into the end of the hose. The tube being now filled with the proper amount of fluid which of course stands at equal height in both of its branches, the instrument is in condition to make the test and is therefore connected by hose 50 with the pipe line and gas admitted to the hose from which it passes into chamber 10 through pipe 45 and into branch 14 of the gauge tube and against the fluid therein so that by noting the relative height of the fluid in the two branches of the tube with the assistance of scale 29, the pressure in the line can be determined in the ordinary way. The test being now completed, the hose is disconnected from the line and the outer sleeve turned with respect to the inner sleeve so as to bring it substantially to the position shown in Fig. 2 in which opening 4 is closed by the segmental portion 7c of the inner sleeve, the spring pressed plunger 12 automatically locking the sleeves together when this position is attained. As the outer sleeve is being turned to close the housing, camming elements 42 ride up on opposite sides of crosshead 35 so as to depress it and force valves 31 against their seats, thereby closing the upper ends of the gauge tube against the passage of fluid therefrom with the result that, irrespective of the position into which the instrument may now be turned, the fluid is maintained in the gauge tube, leakage therefrom prevented and the necessity of wholly or partially refilling it preparatory to the next test obviated. The hose can now be detached from nipple 47 and reintroduced into slot 51, thereby returning all the parts to the position shown in Fig. 2 and placing the instrument in condition for transportation. It will be noted that when in this condition all the delicate parts within the housing are thoroughly protected by the latter so the instrument can be carried in a tool kit in association with tools and other hard objects with substantially no danger of injury since the housing is of such character that it cannot readily be damaged by normal contact with other objects.

While I have herein described one embodiment of my invention with consierable particularity it will be understood that I do not thereby desire or intend to restrict or confine myself thereto as numerous changes and modifications may be made in the specific construction, arrangement and method of assembly of the various instrumentalities employed without departing from the spirit and scope of the invention as defined in the appended claims.

Having thus described my invention, I claim and desire to protect by Letters Patent of the United States:

1. A device of the class described comprising a branched gauge tube, valves respectively controlling the ends of the tube, yielding means biasing the valves to open position, a housing enclosing said elements and comprising relatively movable members having openings adapted when in registry to expose a portion of the tube, means for admitting fluid to one branch of the tube through one of said valves, a passage for the escape of fluid through the other valve, means supporting the tube and valves from one member of the housing, and means carried by the other member adapted to close the valves against the bias of said yielding means as said housing openings are moved out of registry by relative movement of the housing members.

2. A device of the class described, comprising a housing having relatively rotatable cylindrical members nesting one within the other and respectively provided with openings, a branched gauge tube mounted within the inner member, valves controlling the ends of said tube, a spring biasing the valves to open position, means for admitting fluid pressure through the outer member to one of said branches through its valve, a passage for the escape of fluid from the other branch through its valve, and means carried by the outer member of the housing adapted to close both valves against the bias of said spring as the members of the housing are relatively turned to bring their respective openings out of alignment and to allow said valves to open under the bias of said spring as said members are turned to bring their respective openings into alignment.

3. A device of the class described, comprising a housing including a pair of telescoped cylindrical members each provided with an opening in its side, one end of each member being closed, a gauge tube mounted within the inner member having separate branches and means providing a passage between the lower ends thereof, a valve adjacent the upper end of each branch adapted to open and close said end, a spring biasing said valves to open position, means for admitting fluid through one of said valves to the adjacent branch of the tube, means providing a passage for fluid from the other branch of the tube through its adjacent valve, and means carried by one of the housing members operative to close the valves against the bias of the spring as the housing members are turned to a position in which their openings are out of registry.

4. In a device of the class described, a pair of cylindrical sleeves nested one within the other and relatively rotatable about a common axis, each having a longitudinal opening, a gauge tube mounted within the inner sleeve in alignment with its opening, a valve controlling one end of the tube, yielding means biasing the valve to open position, and means carried by the outer sleeve for closing said valve against said bias when the sleeves are turned to move their openings out of registry.

5. In a device of the class described, a pair of sleeves each closed at one end, nesting one within the other and rotatable about a common axis, each sleeve having a longitudinal opening adapted to register with that of the other sleeve, a branched gauge tube mounted in the inner sleeve in alignment with its opening, interconnected valves controlling the ends of said tube, a spring biasing said valves to open position, and a camming element carried by the outer sleeve operative to close the valves against the bias of the spring as the sleeves are turned to move their openings out of registry and to release said spring to open the valves as the tubes are turned to bring the openings into registry to render the tube visible therethrough.

6. In a device of the class described, a housing comprising a pair of sleeves nested one within the other each closed at one end and rotatable about a common axis, a pair of parallel gauge tubes mounted in the inner sleeve, means forming a connection between adjacent ends of the tubes, valves respectively controlling the opposite ends of the tubes, a crosshead interconnecting the valves, a spring biasing the valves to open position, and camming elements carried by the outer sleeve operative to engage and move the crosshead against the spring to close the valves as the sleeves are turned to bring their openings out of registry and to disengage the crosshead as the sleeves are turned to bring their openings into registry and thereby render the gauge tubes visible through the housing.

7. A device of the class described, comprising a housing including a pair of relatively rotatable cylindrical sleeves nested one within the other and each closed at one end, the inner sleeve having a pair of longitudinally extending diametrically opposed openings and the outer sleeve a single longitudinally extending opening, a gauge tube mounted within and movable with the inner sleeve, means for admitting fluid to the tube including a pipe communicating with the tube and a hose connectable with the housing for attachment to the fluid source, and means disposed in the inner sleeve adjacent one of its openings to form a pocket for the reception of said hose when detached from the housing and the sleeves are turned to a position in which said opening is in registry with that in the outer sleeve.

8. A device of the class described comprising a housing including a pair of relatively rotatable cylindrical sleeves nested one within the other and each closed at one end, the inner sleeve having a pair of longitudinally extending diametrically opposed openings and the outer sleeve a single longitudinally extending opening adapted to register with either opening in the inner sleeve, a gauge tube mounted within and movable with the inner sleeve, means for admitting fluid to the tube including means providing a passage communicating with a fitting in the outer sleeve and a hose connectable with said fitting for attachment to the fluid source, and means associated with one of the openings in the inner sleeve forming therewith a pocket interiorly of the inner sleeve for the reception of the hose when said opening is in registry with the opening in the outer sleeve.

MONTGOMERY L. GANSER.